United States Patent
Arokiaraj et al.

(10) Patent No.: US 10,445,347 B2
(45) Date of Patent: Oct. 15, 2019

(54) POSITIONAL ROUTE GUIDANCE

(71) Applicant: International Business Machines Corporation, Armonk, NY (US)

(72) Inventors: Francis S. Arokiaraj, Bangalore (IN); Cary L. Bates, Rochester, MN (US); Premananda Mohapatra, Bangalore (IN); Sachin M. Nayak, Bangalore (IN); Sreenivasulu Valmeti, Nellore (IN)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 14/940,927

(22) Filed: Nov. 13, 2015

(65) Prior Publication Data

US 2017/0139953 A1 May 18, 2017

(51) Int. Cl.
*G06F 16/29* (2019.01)
*G06F 16/9537* (2019.01)
*G06F 16/2457* (2019.01)

(52) U.S. Cl.
CPC ........ *G06F 16/29* (2019.01); *G06F 16/24575* (2019.01); *G06F 16/9537* (2019.01)

(58) Field of Classification Search
CPC ................. G06F 17/30241; G06F 17/30528
See application file for complete search history.

(56) References Cited

U.S. PATENT DOCUMENTS

| | | | |
|---|---|---|---|
| 8,930,135 B2 | 1/2015 | Abramovich Ettinger | |
| 2003/0078727 A1* | 4/2003 | Komatsu | G01C 21/3461 |
| | | | 701/411 |
| 2004/0243306 A1* | 12/2004 | Han | G01C 21/3682 |
| | | | 701/438 |
| 2008/0221786 A1* | 9/2008 | Otsuki | G01C 21/3611 |
| | | | 701/532 |
| 2010/0168996 A1* | 7/2010 | Bourque | G01C 21/3611 |
| | | | 701/532 |
| 2011/0184637 A1 | 7/2011 | Jouline et al. | |
| 2011/0196602 A1 | 8/2011 | Pfeifle et al. | |
| 2012/0016583 A1* | 1/2012 | Cheung | G01C 21/3407 |
| | | | 701/426 |
| 2013/0166197 A1* | 6/2013 | Tseng | G01C 21/3644 |
| | | | 701/426 |

OTHER PUBLICATIONS

Depriest, D., "Working with Routes", GPS Information, Printed on Aug. 27, 2015, 12:51 pm, pp. 1-7, <http://www.gpsinformation.org/dale/routes.htm>.
Friedman R. et al., "WISER: A Web-based Interactive Route Search System for Smartphones", WWW 2012, Apr. 16-20, 2012, Lyon, France, ACM, Copyright is held by the International World Wide Web Conference Committee (IW3C2), pp. 1-4.

* cited by examiner

*Primary Examiner* — Jensen Hu
(74) *Attorney, Agent, or Firm* — Brian M. Restauro

(57) ABSTRACT

Embodiments of the present invention provide methods, program products, and systems for locating an unknown location by searching known geographical indicators. Embodiments of the present invention can be used to receive a search query for an unknown location. The search query can comprise one or more symbols denoting geographical indicators representative of the unknown location. Embodiments of the present invention can be used to locate unknown locations by searching for a location that matches the one or more symbols representative of the unknown location and returning results that match the received search query.

20 Claims, 6 Drawing Sheets

POSITIONAL ROUTE GUIDANCE

BACKGROUND

The present invention relates generally to the field of navigation systems, and more particularly to geographical indicators used navigation systems.

In general, navigation systems can determine the position of a user from radio signals of satellites. Typically, navigation systems receive radio signals, calculate a user's position, and route a user to an intended destination. In some instances, navigation systems have features that allow a user to sort route preferences by shortest route and fastest route. In other instances, navigation systems have features to avoid certain locations (e.g., toll roads).

SUMMARY

Embodiments of the present invention provide methods, program products, and systems for locating an unknown location by searching known geographical indicators. In one embodiment, a method is provided, which includes: receiving a search query for an unknown location, wherein the search query comprises one or more symbols denoting geographical indicators representative of the unknown location; searching for a location that matches the one or more symbols representative of the unknown location; and returning results that match the received search query.

DETAILED DESCRIPTION

Embodiments of the present invention recognize that navigation systems can be lacking in terms of searchable features. Typically, to find a location, a user must know the name of the desired location or the address of a location in order for the navigation system to locate and calculate a route to the desired location. Embodiments of the present invention provide solutions that allow a navigation system to search beyond conventional methods of searching (e.g., by address and/or name of the desired location). In this manner, as discussed in greater detailed later in this specification, embodiments of the present invention can be used to locate desired locations based, at least in part, on geographical indicators.

Figure 1:
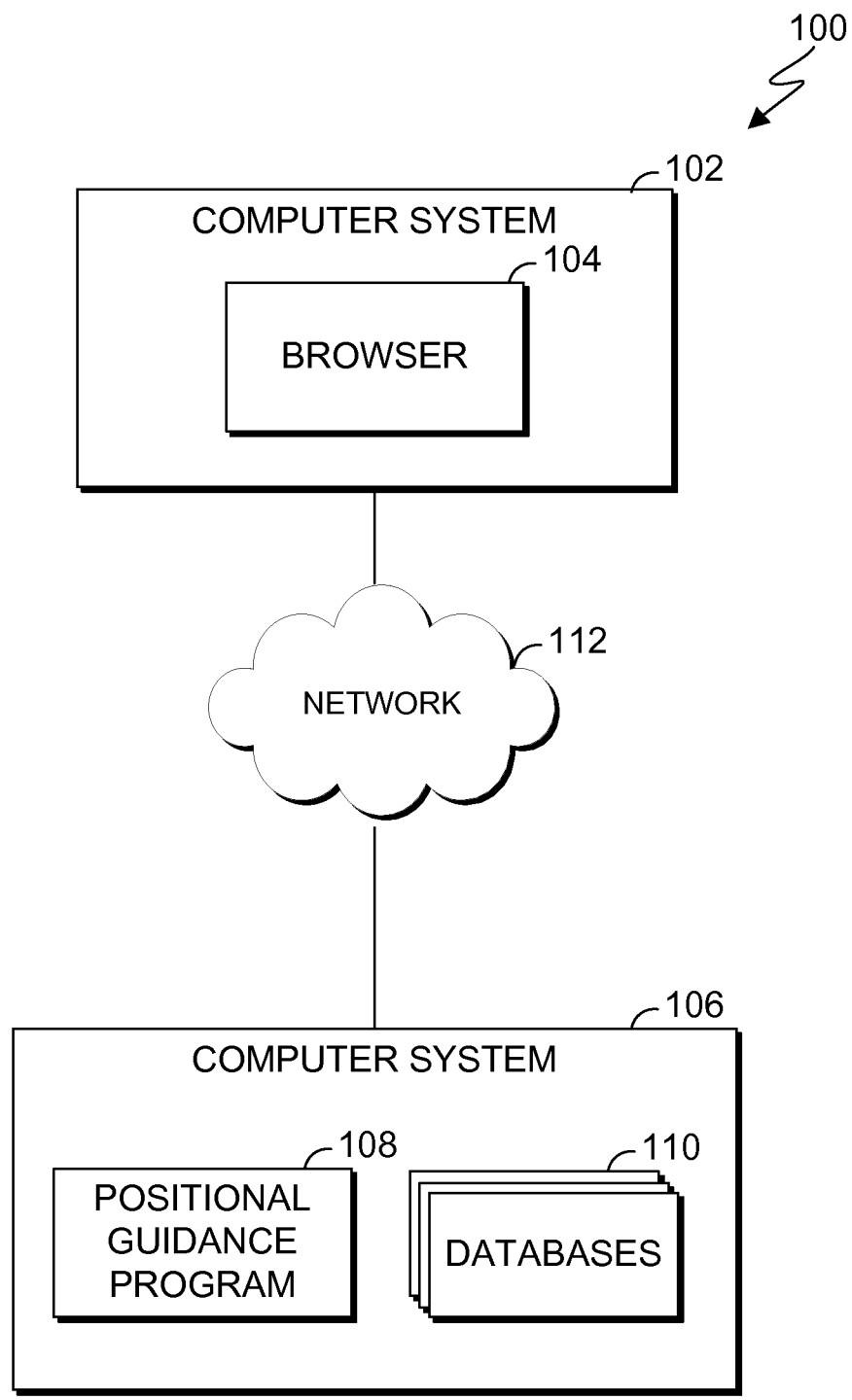
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102 and computer system 106. Computer system 102 and computer system 106 can be desktop computers, laptop computers, specialized computer servers, or any other computer systems known in the art. In certain embodiments, computer system 102 and computer system 106 represent computer systems utilizing clustered computers and components to act as a single pool of seamless resources when accessed through network 112. For example, such embodiments may be used in data center, cloud computing, storage area network (SAN), and network attached storage (NAS) applications. In certain embodiments, computer system 102 and computer system 106 represent virtual machines. In general, computer system 102 and computer system 106 are representative of any electronic devices, or combination of electronic devices, capable of executing machine-readable program instructions, as described in greater detail with regard to FIG. 6.

Computer system 102 includes browser 104. Browser 104 communicates with computer system 106 to access positional guidance program 108 (e.g., using TCP/IP) to enter one or more user search queries. A search query is a string of query terms pertaining to a particular location of interest to a user. In this embodiment, a search query can be one or more graphical icons representative of geographical indicators used to locate an area of interest. The term "geographical indicators", as used herein, refer to positional information that can be entered by a user. For example, a geographical indicator can be a junction point (such as Y, X, O-shaped junctions), places of interests (such as gas station, restaurant, hospital, etc.), directional information with respect to places of interests (such as right of gas station, left of restaurant, etc.), proximity to a current or known location (such as a search radius), and navigational direction with respect to the proximity to a current location (such as north, south, east, west, etc.). In general, browser 104 can be implemented using a browser and web portal or any program that transmits search queries to, and receives results from, computer system 106.

Computer system 106 includes positional guidance program 108 and databases 110. Positional guidance program 108 displays graphical representations of selectable graphical indicators that a user can use to enter search queries, receives search queries (such as one or more geographical indicators), searches databases 110 for one or more geographical locations that match the terms of the search query, and returns results that match the terms of the search query to computer system 102. For example, a user can specify the following geographical indicators as terms of a search query: a Y-shaped junction, west of the current location, within a ten mile radius, that is next to a gas station. Responsive to receiving a search query with the above-mentioned geographical indicators, positional guidance program 108 searches databases 110 for locations that match the terms of the search query. Accordingly, positional guidance program 108 returns results to computer system 102 that match the terms of the search query (such as a location that matches the geographical indicators specified by the user). A user can then select an option to generate a route to his/her intended destination directing him/her through the geographical indicators specified.

Where a desired location is unknown by conventional methods (e.g., a user does not know the name or address of a location), but is known by geographical indicators, embodiments of the present invention can search databases containing maps (e.g., databases 110) for geographical indicators that match the terms of the search query. In this embodiment, positional guidance program 108 searches for geographical indicators that match the terms of the search query by identifying a general region of interest by using a user specified radius (e.g., within 10 miles of a current location) and direction with respect to the specified radius (e.g., west of a current location). Positional guidance program 108 can then refine the search by identifying other geographical indicators within the region of interest. For example, positional guidance program 108 can search for junction points that match the terms of the search query within the region of interest.

Where a desired location is known and a route has already been generated by conventional methods, embodiments of the present invention can be used to alter a given route based, at least in part, on received geographical indicators. For example, positional guidance program 108 can receive a request to alter a generated route. In this example, a user has specified a search query of a roundabout intersection, west of the current location, within ten miles. Responsive to receiving the search query (such as the geographical indicators), positional guidance program 108 can find locations that match the geographical indicators and return the results (e.g., locations that match the geographical indicators) to computer system 102.

For illustrative purposes, the following discussion is made with respect to positional guidance program 108 and databases 110 residing on computer system 106. However, it should be understood that positional guidance program 108 and databases 110 can be local to computer system 102 (e.g., a user's personal computer, car navigation system, tablet, etc.) or distributed throughout the computer systems described in FIG. 1.

Databases 110 include one or more maps capable of being accessed by positional guidance program 108. In general, databases 110 can be implemented with any storage architecture known in the art.

Network 112 can be, for example, a local area network (LAN), a wide area network (WAN) such as the Internet, or a combination of the two, and include wired, wireless, or fiber optic connections. In general, network 112 can be any combination of connections and protocols that will support communications between computer system 102 and computer system 106, in accordance with a desired embodiment of the invention.

Figure 2:
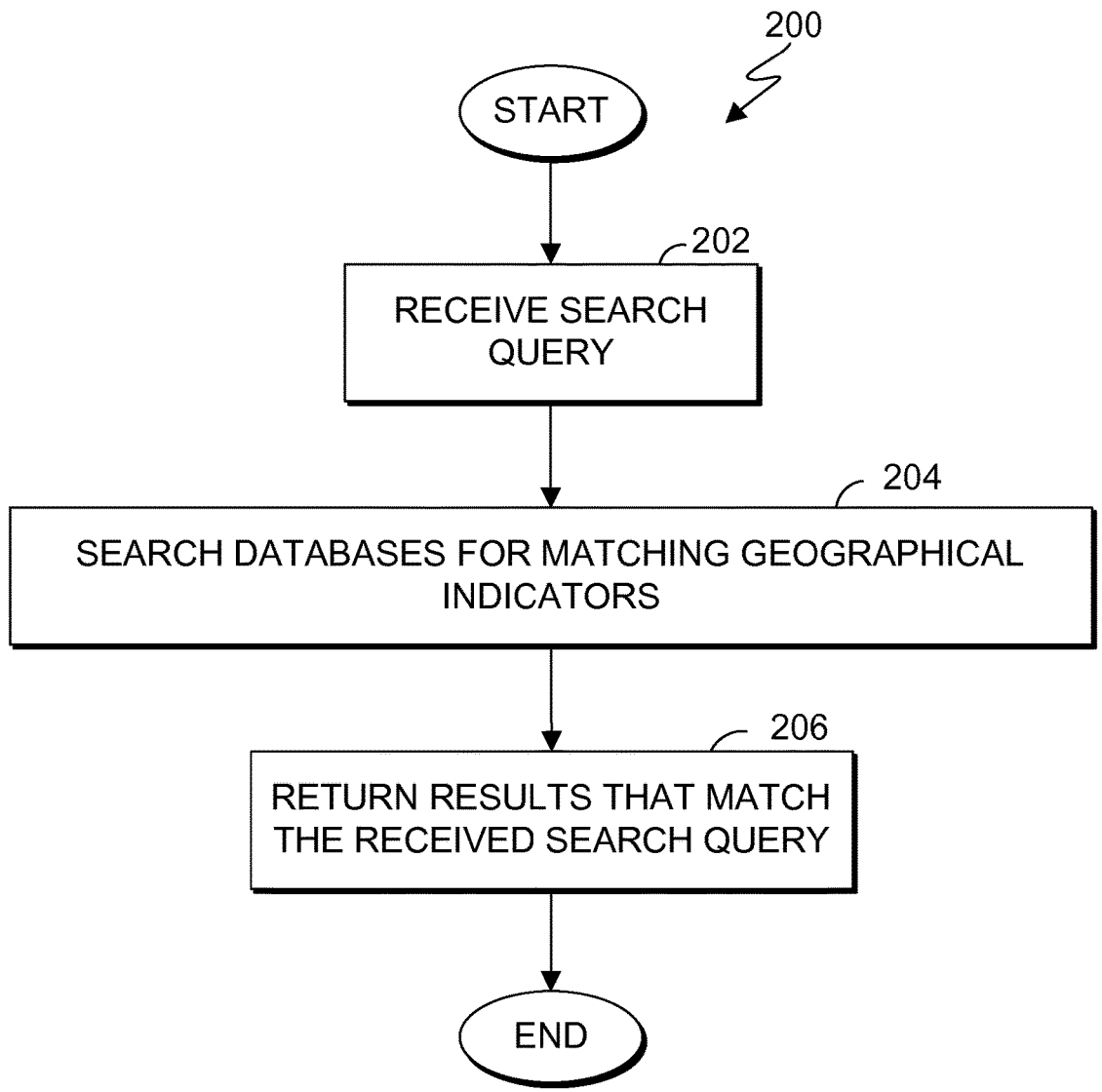
FIG. 2 is a flowchart illustrating operational steps for searching matching geographical indicators, in accordance with an embodiment of the present invention.

FIG. 2 is a flowchart 200 illustrating operational steps for searching matching geographical indicators, in accordance with an embodiment of the present invention.

In step 202, positional guidance program 108 receives a search query. In this embodiment, positional guidance program 108 receives a search query from browser 104. As previously discussed a search query can include one or more graphical icons representative of geographical indicators used to locate an area of interest (such as a junction point (such as Y, X, O-shaped junctions)), places of interests (such as gas station, restaurant, hospital, etc.), directional information with respect to places of interests (such as right of gas station, left of restaurant, etc.), proximity to a current or known location (such as a search radius), and navigational direction with respect the proximity to a current location (such as north, south, east, west, etc.)). In other embodiments, positional guidance program 108 can receive search queries from one or more other components of computing environment 100.

In step 204, positional guidance program 108 searches databases for matching geographical indicators. In this embodiments, positional guidance program 108 searches databases for matching geographical indicators by identifying a search radius and refining the search to geographical indicators that match the terms of the search query within the search radius. For example, a user can select the following geographical indicators as terms for a search query: a Y-shaped junction, west of the current location, within a ten mile radius, that is next to a gas station.

In this embodiment, positional guidance program 108 searches databases for matching geographical indicators by identifying a current location and identifying a search radius in proximity to the current location. For example, positional guidance program 108 can identify from the search query that the search radius is ten miles from the current location specified by the user.

Positional guidance program 108 can then refine the search to find a location that matches other geographical indicators specified by the user. Continuing the above example, positional guidance program 108 can refine the search by using geographical indicators specified in the search query (e.g., a Y-shaped junction, west of the current location that is next to a gas station). Accordingly, positional guidance program 108 searches databases 110 for locations that match the geographical indicators of the search query.

In step 206, positional guidance program 108 returns results that match the received search query. In this embodiment, positional guidance program 108 returns results that match the received search query to browser 104 of computer system 102. Accordingly, a user can select a result as an intended destination. In this embodiment, positional guidance program 108 can optionally generate a route to the selected intended destination. In this embodiment, positional guidance program 108 can provide other options (such as filter routes based on distance, traffic conditions, etc.) to assist in route generation.

In instances where a route has been generated and a user wants to change the route, positional guidance program 108 can receive a generated route and search query terms (such as geographical indicators) to find a route that matches the geographical indicators of the search query. For example, positional guidance program 108 can receive a request to alter a generated route. In this example, a user has specified a search query of a roundabout intersection, east of the current location, within five miles. Responsive to receiving the search query (such as the geographical indicators), positional guidance program 108 can find locations that match the geographical indicators and return the results by repeating the operational steps of flowchart 200.

Accordingly, in this embodiment, positional guidance program 108 can locate intended locations based, at least in part, on geographical indicators without knowing conventional identifiers such as an address, global positioning system (GPS) coordinates, location name, etc. In some instances, positional guidance program 108 can generate or alter a route responsive to identifying matching geographical indicators.

Figure 3A:
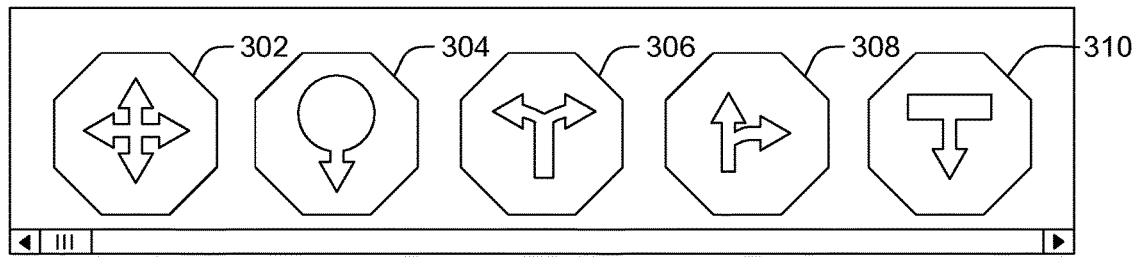
FIGS. 3A-C are example graphical icons that denote geographical indicators, in accordance with an embodiment of the present invention.
Figure 3B:
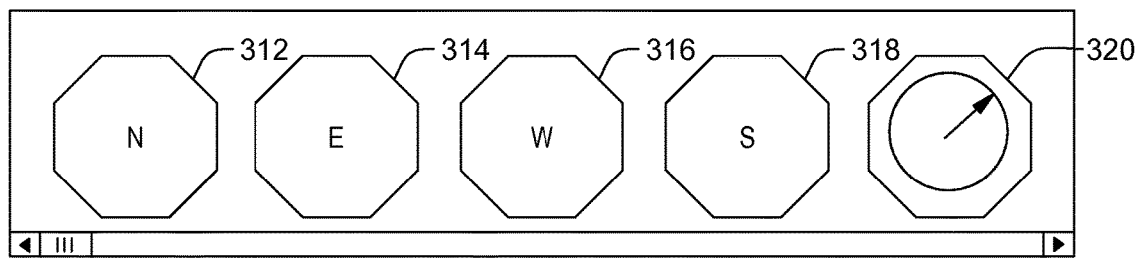
Figure 3C:
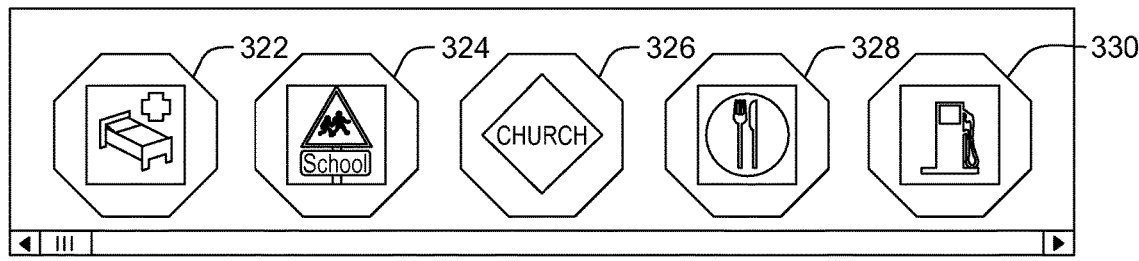

FIGS. 3A-C are example graphical icons that denote geographical indicators, in accordance with an embodiment of the present invention. For example, the graphical icons discussed below can be displayed after accessing positional guidance program 108 (via browser 104).

FIG. 3A displays graphical icons representative of geographical indicators. Specifically, the graphical icons depicted in FIG. 3A are representative of junction points (such as Y, X, O junctions, etc.). For example, icon 302 denotes a four-way intersection. Icon 304 denotes a cul-de-sac. Icon 306 denotes a Y shaped junction where traffic must turn left or right. Icon 308 denotes a junction where traffic can keep going straight or turn right. Icon 310 denotes a junction where traffic must flow in a single direction.

FIG. 3B displays graphical icons representative of a different set of geographical indicators. Specifically, the graphical icons depicted in FIG. 3B are representative of cardinal directions (such as north south, east, west).

For example, icon 312 denotes the cardinal direction of "north". Icon 314 denotes "east". Icon 316 denotes "west" and icon 318 denotes "south". Icon 320 denotes a locator icon. For example, responsive to selecting icon 320, positional guidance program 108 can display a map and a current location.

FIG. 3C displays graphic icons represented of another set of geographical indicators. Specifically, the graphical icons depicted in FIG. 3C are representative of places of interest.

For example, icon 322 denotes a hospital. Icon 324 denotes a school. Icon 326 denotes a church. Icon 328 denotes a restaurant. Icon 330 denotes a gas station. When selected, an optional menu (not shown) is displayed that give a user an option to indicate a general direction to search for, as discussed in greater detail with regard to FIG. 4. For example, responsive to selecting icon 322, positional guidance program 108 can display with graphical icons to indicate a general direction (such as left or right of the selected icon). In other words, responsive to selecting icon 322 (such as a hospital), positional guidance program 108 can display options to indicate whether the desire geographical indicator is to the left or right of the hospital.

Figure 4:
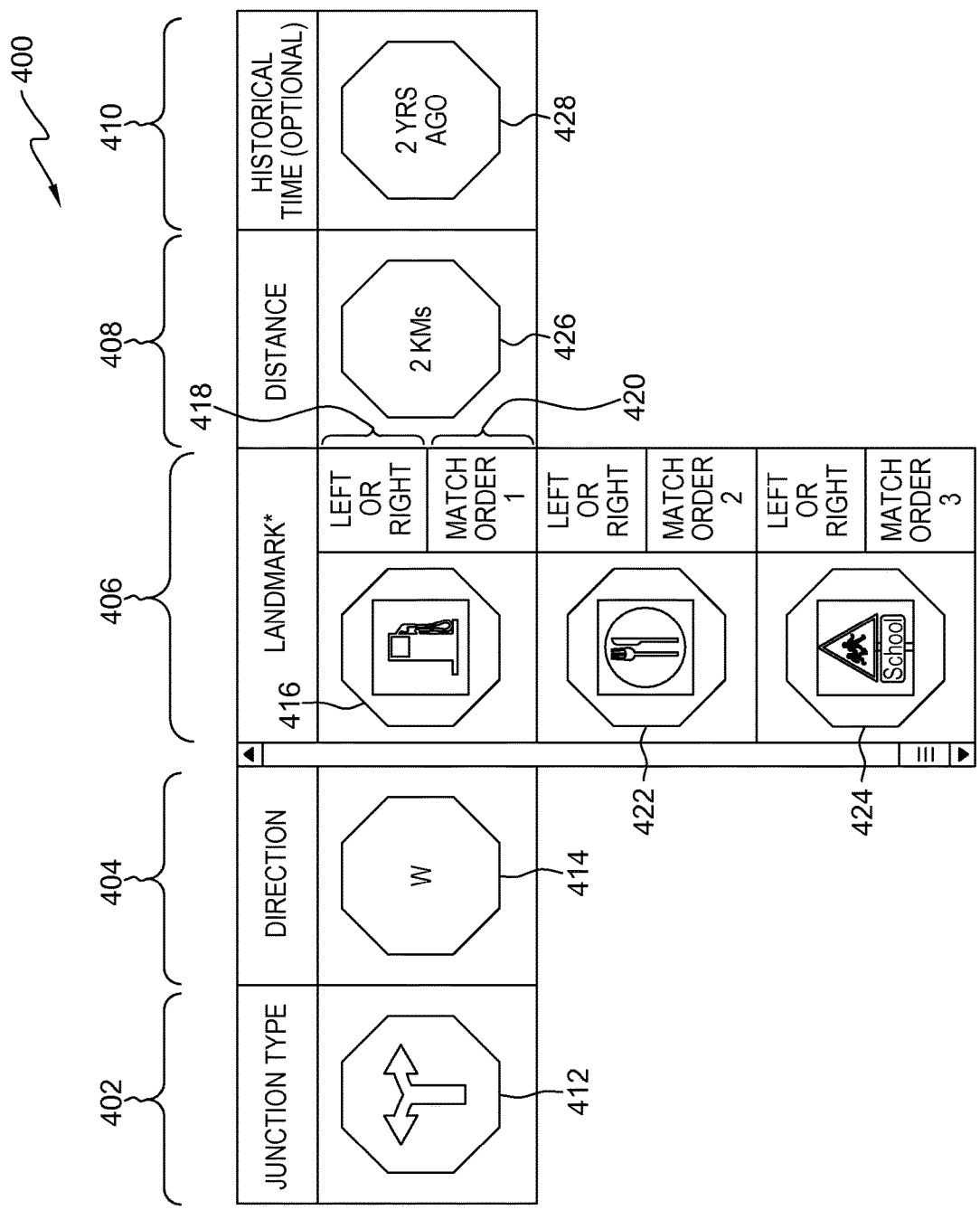
FIG. 4 is an example graphical user interface for inputting geographical indicators, in accordance with another embodiment of the present invention.

FIG. 4 is an example graphical user interface 400 for inputting geographical indicators, in accordance with another embodiment of the present invention. Specifically, positional guidance program 108 can generate graphical user interface 400 which includes multiple graphical icons representative of geographical indicator categories and respective selectable geographical indicators.

The term "geographical indicator category", as used herein, refers to different geographical indicators. For example, a geographical indicator category can be a junction point (such as Y, X, O junctions), places of interests (such as gas station, restaurant, hospital, etc.), directional information with respect to places of interests (e.g., right of gas station, left of restaurant, etc.), proximity to a current or known location (such as a search radius), and navigational direction with respect the proximity to a current location (such as north, south, east, west, etc.). In other embodiments, graphical user interface 400 can include other geographical indicator categories such as historical time. For example, a user can specify that a landmark or place of interest existed in the search area within the last five years.

In this embodiment, a user can select graphical icons via a mouse and/or keyboard. In other embodiments, where positional guidance program 108 resides on a portable device (such as a phone, or portable navigation system), a user can select graphical icons by touch. Responsive to selecting a graphical icon for a geographical indicator category (such as junction type), positional guidance program 108 can display a list of graphical icons for junction types.

In this example, graphical icons 402-410 denote different geographical indicator categories (such as junction types, direction, places of interests/landmarks, distance, etc.) that a user can select as part of a search query. For example, icon 402 denotes a geographical indicator option for junction type. Responsive to selecting icon 402, positional guidance program 108 displays geographical indicators for junction types (such as X, O, Y junctions). In this example, the user has selected icon 412, which denotes a Y junction, has been selected.

Icon 404 denotes a different geographical indicator category. Specifically, icon 404 denotes a geographical indicator category for direction. In this example, a user has selected icon 414 which denotes "west".

Icon 406 denotes another geographical indicator category. Specifically, icon 406 denotes a geographical indicator category for landmarks (i.e., places of interest). In this example, a user has selected icon 406. Responsive to selecting icon 406, positional guidance program 108 displays a list of graphical icons denoting options for landmark types. In this example, positional guidance program 108 displays icons 416, 422, and 424 which represent a gas station, restaurant, and school, respectively.

Continuing the above example, positional guidance program 108 can display options to indicate a direction (such as left or right) with respect to a landmark to help refine a search. For example, a user can select icon 416 that denotes a gas station and select icon 418 to specify the desired location is located left of the gas station.

Furthermore, a user can specify a priority order for the selected landmark type (such as icon 416). In this example, a user has selected that positional guidance program 108 prioritize the gas station first. In instances where more than one graphical icon for landmark types has been selected, (e.g., where a user has selected icons 416, 422, and 424), a user can specify a priority order for each landmark type. For example, a user can specify that icon 416 be prioritized first, icon 422, be prioritized second, and icon 424, to be prioritized third. In other words, a user can specify an order in which to find matching geographical indicators.

Icon 408 denotes another geographical indicator category. Specifically, icon 408 denotes a geographical indicator category for distance. In this example, a user has specified that the area to be located is within two kilometers. Positional guidance program 108 can then search for matching geographical indicators within a two kilometer radius of a known location. For example, positional guidance program 108 can search for matching geographical indicators within a two kilometer radius of a current location.

Optionally, positional guidance program 108 can display icon 410 which denotes yet another geographical indicator category. Specifically, icon 410 denotes a geographical indicator based on time. Continuing the examples above, a user can specify using icons 412, 414, 416, and 426 to specify that positional guidance program 108 should be searching for a location that matches a Y junction type, west of the current location, left of a gas station, within a two kilometer radius. By selecting icon 410, a user can input a time-based criteria (i.e., how long ago a location existed). Specifically, a user can specify that the location to be searched existed at least two years ago. In this example, a user has selected icon 428 which denotes a time based criteria dating two years ago. In other words, by selecting icon 410 a user can specify that positional guidance program 108 should be searching for a location that matches a Y junction type, west of the current location, left of a gas station, within a two kilometer radius that existed at least two years ago.

Figure 5A:
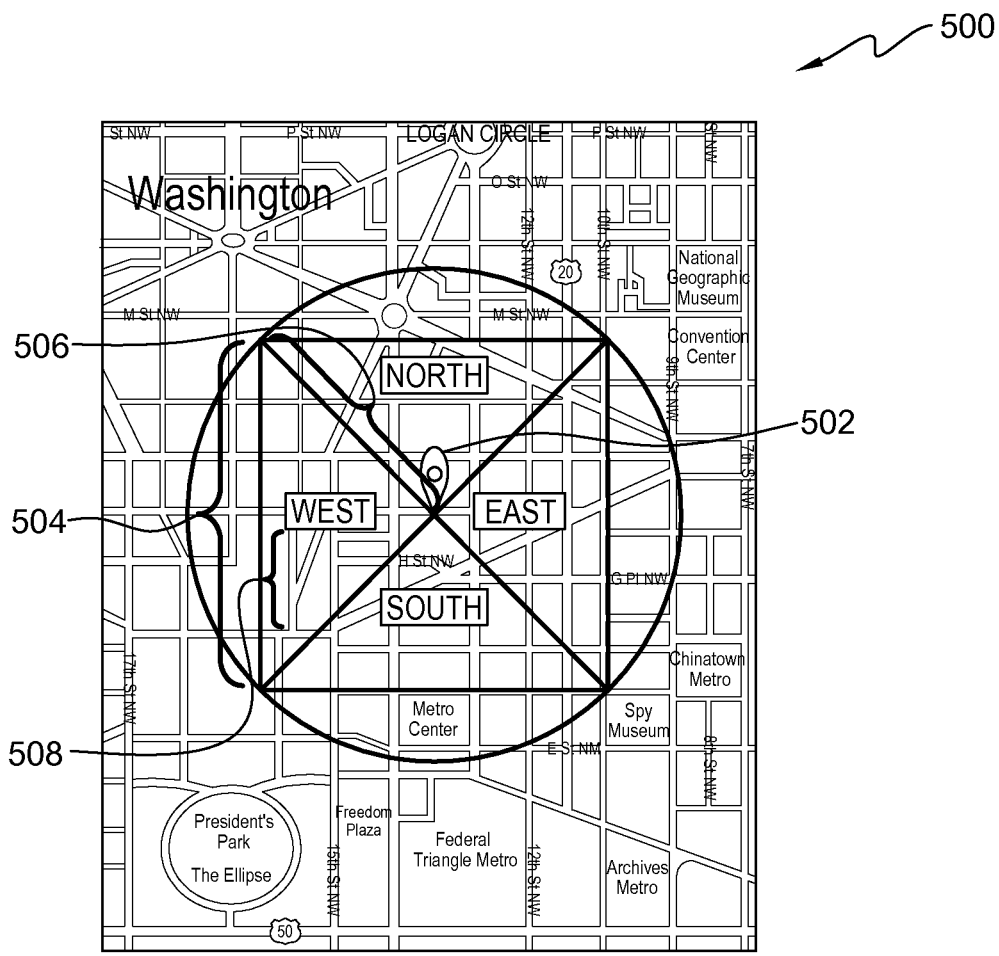
FIGS. 5A and 5B are example screenshots generated responsive to receiving a user search query for geographical indicators, in accordance with an embodiment of the present invention.
Figure 5B:
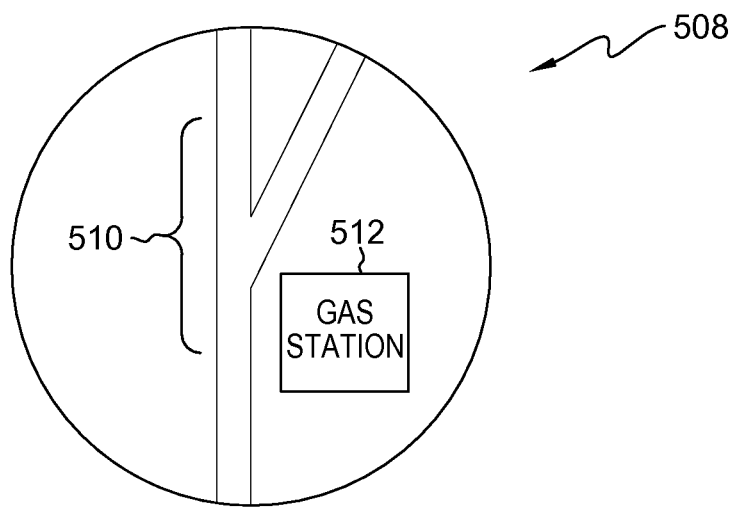

FIGS. 5A and 5B are example screenshots generated responsive to receiving a user search query for geographical indicators, in accordance with an embodiment of the present invention. Specifically, FIGS. 5A and 5B are example screenshots generated responsive to receiving a user query selected from graphical user interface 400 of FIG. 4.

FIG. 5A displays a screenshot of map 500 displaying a search location factoring in geographical indicators received from a search query.

In this example, a user has inputted a search query to positional guidance program 108. Specifically, browser 104 transmitted a search query with the following criteria: to search for a Y junction that is left of a gas station, within a ten mile radius, west of the user's current location.

Responsive to receiving the user's search query, positional guidance program 108 displays map 500. Map 500 displays the user's current location which is denoted by icon 502. In this example, line 506 denotes the search radius of ten miles. Region 504 indicates the area to be searched which is west of icon 502. Graphic 508 reflects a matching location to the user search query (i.e., a Y-shaped junction).

FIG. 5B displays an example screen shot of a location that matches a user search query. Specifically, FIG. 5B displays an enlarged view of graphic 508 which denotes a matching location.

Responsive to selecting graphic 508, positional guidance program 108 can display an enlarged view of a location that matches the user query. For example, positional guidance program 108 can display an enlarged Y shaped junction 510 that matches the geographical indicator transmitted in the search query (such as the geographical indicator of a Y shaped junction that is left of a gas station). Positional guidance program 108 further displays matching location 512 which, in this example, is a gas station. Accordingly, a user can transmit instructions to positional guidance program 108 to generate a route leading to matching location 512.

Figure 6:
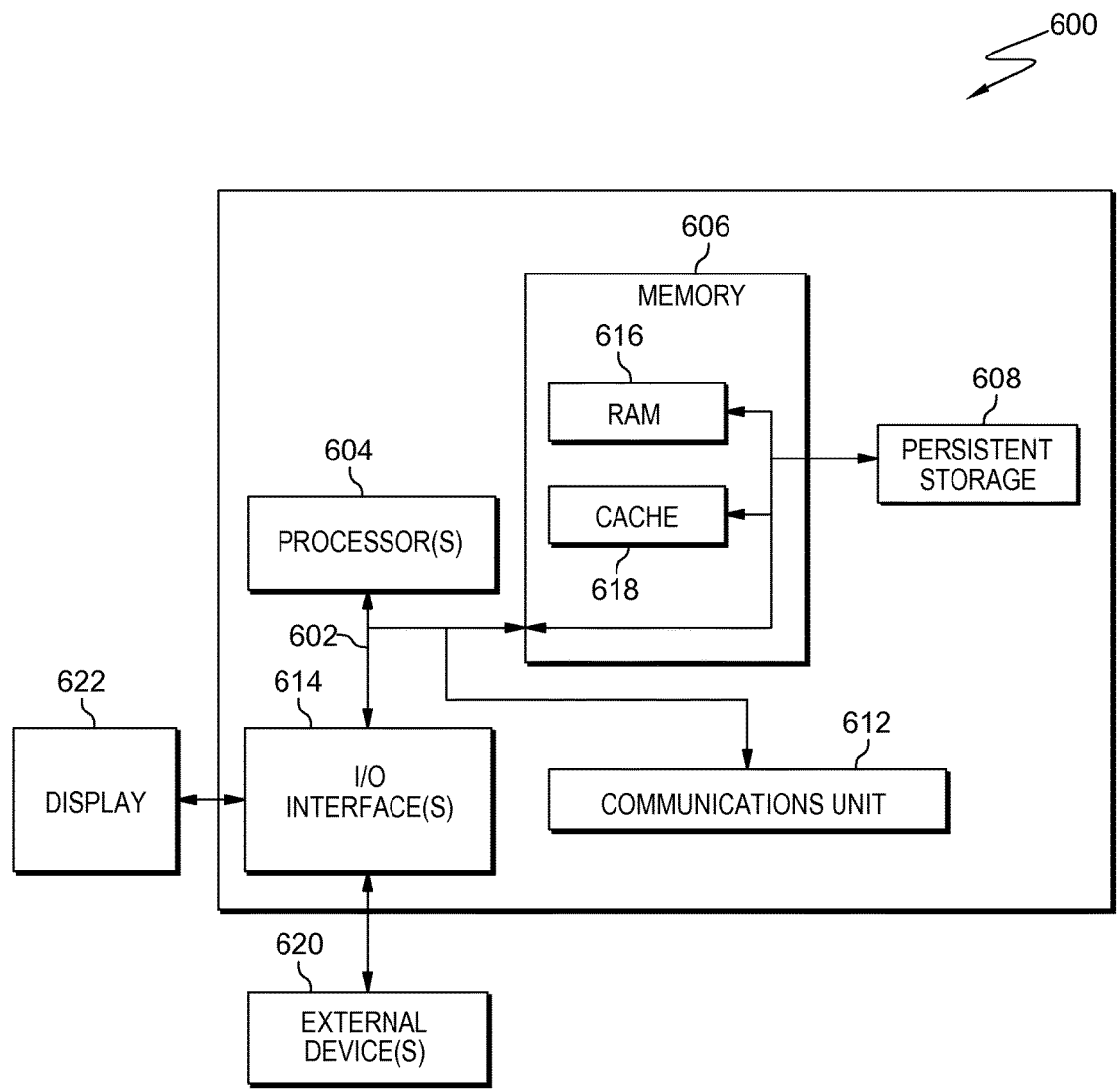
FIG. 6 is a block diagram of internal and external components of the computer systems of FIG. 1, in accordance with an embodiment of the present invention.

FIG. 6 is a block diagram of internal and external components of a computer system 600, which is representative of the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 808.

Communications unit 612 provides for communications with other computer systems or devices via a network (e.g., network 112). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a search query for an unknown location, wherein the search query comprises one or more symbols, wherein a symbol among the one or more symbols denotes a geographical indicator category that includes a junction point indicating a junction type in proximity to a place of interest;
   searching, by one or more computer processors, for a location based on the received one or more symbols, wherein at least one of the received symbols includes a symbol denoting a geographical indicator category that includes a junction point indicating a junction type in proximity to a place of interest;

returning, by one or more computer processors, results that match the received search query; and in response to receiving a selection among the results, generating a route to the location associated with the received selection.

2. The method of claim 1, wherein the geographical indicator category further comprises one or more: a cardinal direction with respect to the known location, directional information with respect to the place of interest, proximity to a known location, and a historical indicator.

3. The method of claim 1, further comprising:

generating, by one or more computer processors, a route to a location that matches the one or more symbols representative of the unknown location.

4. The method of claim 3, further comprising:

providing, by one or more computer processors, an option to display multiple routes based, at least in part, on traffic conditions and distance.

5. The method of claim 1, wherein searching, by one or more computer processors, for a location that matches the one or more symbols representative of the unknown location comprises:

identifying, by one or more computer processors, a known location, wherein the known location can be a user's current location or a user-defined location; and refining, by one or more computer processors, a search region based, at least in part, on received geographical indicators.

6. The method of claim 5, wherein refining, by one or more computer processors, a search region based, at least in part, on received geographical indicators comprises:

identifying, by one or more computer processors, a search radius;

identifying, by one or more computer processors, a direction within the search radius;

identifying, by one or more computer processors, places of interest within the identified direction that is within the identified search radius;

identifying, by one or more computer processors, junction points within the identified direction that is within the identified search radius; and identifying, by one or more computer processors, one or more locations that match junction points and places of interest within the identified direction of the identified search radius.

7. The method of claim 6, further comprising:

ranking, by one or more computer processors, the identified one or more locations based, at least in part on proximity to the identified known location.

8. A computer program product comprising:

one or more computer readable storage media and program instructions stored on the one or more computer readable storage media, the program instructions comprising:

program instructions to receive a search query for an unknown location, wherein the search query comprises one or more symbols, wherein a symbol among the one or more symbols denotes a geographical indicator category that includes a junction point indicating a junction type in proximity to a place of interest;

program instructions to search for a location based on the received one or more symbols, wherein at least one of the received symbols includes a symbol denoting a geographical indicator category that includes a junction point indicating a junction type in proximity to a place of interest;

program instructions to return results that match the received search query; and in response to receiving a selection among the results, program instructions to generate a route to the location associated with the received selection.

9. The computer program product of claim 8, wherein the geographical indicator category further comprises one or more: a cardinal direction with respect to the known location, directional information with respect to the place of interest, proximity to a known location, and a historical indicator.

10. The computer program product of claim 8, wherein the program instructions stored on the one or more computer readable storage media further comprise:

program instructions to generate a route to a location that matches the one or more symbols representative of the unknown location.

11. The computer program product of claim 10, wherein the program instructions stored on the one or more computer readable storage media further comprise:

program instructions to provide an option to display multiple routes based, at least in part, on traffic conditions and distance.

12. The computer program product of claim 8, wherein program instructions to search for a location that matches the one or more symbols representative of the unknown location comprise:

program instructions to identify a known location, wherein the known location can be a user's current location or a user-defined location; and program instructions to refine a search region based, at least in part, on received geographical indicators.

13. The computer program product of claim 12, wherein program instructions to refine a search region based, at least in part, on received geographical indicators comprise:

program instructions to identify a search radius; program instructions to identify a direction within the search radius;

program instructions to identify places of interest within the identified direction that is within the identified search radius;

program instructions to identify junction points within the identified direction that is within the identified search radius; and program instructions to identify one or more locations that match junction points and places of interest within the identified direction of the identified search radius.

14. The computer program product of claim 13, wherein the program instructions stored on the one or more computer readable storage media further comprise:

program instructions to rank the identified one or more locations based, at least in part on proximity to the identified known location.

15. A computer system comprising: one or more computer processors;

one or more computer readable storage media; and program instructions stored on the one or more computer readable storage media for execution by at least one of the one or more computer processors, the program instructions comprising:

program instructions to receive a search query for an unknown location, wherein the search query comprises one or more symbols, wherein a symbol among the one or more symbols denotes a geographical indicator category that includes a junction point indicating a junction type in proximity to a place of interest;

program instructions to search for a location based on the received one or more symbols, wherein at least one of the received symbols includes a symbol denoting a geographical indicator category that includes a junction point indicating a junction type in proximity to a place of interest;

program instructions to return results that match the received search query; and in response to receiving a selection among the results, program instructions to generate a route to the location associated with the received selection.

16. The computer system of claim 15, wherein the geographical indicator category further comprises one or more: a cardinal direction with respect to the known location, directional information with respect to the place of interest, proximity to a known location, and a historical indicator.

17. The computer system of claim 15, wherein the program instructions stored on the one or more computer readable storage media further comprise:

program instructions to generate a route to a location that matches the one or more symbols representative of the unknown location.

18. The computer system of claim 17, wherein the program instructions stored on the one or more computer readable storage media further comprise:

program instructions to provide an option to display multiple routes based, at least in part, on traffic conditions and distance.

19. The computer system of claim 15, wherein program instructions to search for a location that matches the one or more symbols representative of the unknown location comprise:

program instructions to identify a known location, wherein the known location can be a user's current location or a user-defined location; and program instructions to refine a search region based, at least in part, on received geographical indicators.

20. The computer system of claim 19, wherein program instructions to refine a search region based, at least in part, on received geographical indicators comprise:

program instructions to identify a search radius; program instructions to identify a direction within the search radius;

program instructions to identify places of interest within the identified direction that is within the identified search radius;

program instructions to identify junction points within the identified direction that is within the identified search radius; and program instructions to identify one or more locations that match junction points and places of interest within the identified direction of the identified search radius.

* * * * *